United States Patent [19]

Tisbo et al.

[11] Patent Number: 4,615,636
[45] Date of Patent: Oct. 7, 1986

[54] CONNECTOR CONSTRUCTION

[75] Inventors: Cosmo N. Tisbo; Thomas A. Tisbo, both of Barrington; Richard D. Recker, Palatine; Bruce Heggeland, Rolling Meadows, all of Ill.

[73] Assignee: Suncast Corporation, Batavia, Ill.

[21] Appl. No.: 483,825

[22] Filed: Apr. 11, 1983

[51] Int. Cl.[4] .......................... B25G 3/00; F16D 1/00
[52] U.S. Cl. ....................... 403/8; 403/260; 403/237
[58] Field of Search ...................... 403/7, 8, 252, 260, 403/264, 200, 193, 237, 234

[56] References Cited

U.S. PATENT DOCUMENTS

| 1,460,928 | 7/1923 | Tilden | 403/260 X |
| 2,602,493 | 7/1952 | Burdick | 403/7 |
| 2,647,000 | 7/1953 | Colley | 403/237 |
| 3,891,334 | 6/1975 | Loikitz | 403/234 |
| 4,150,907 | 4/1979 | Thurnauer | 403/234 |
| 4,286,891 | 9/1981 | Gerner et al. | 403/7 |
| 4,303,267 | 12/1981 | Haberle et al. | 403/7 X |

Primary Examiner—Andrew V. Kundrat
Attorney, Agent, or Firm—Anthony S. Zummer

[57] ABSTRACT

This invention relates to an improved connector construction for releasably connecting one tubular member to another. A first tubular member has an aperture contained therein. A screw fastener member is mounted in the aperture. The screw fastener has an enlarged portion on the exterior of the tubular member preventing the screw fastener from passing through the aperture into the interior of the tube. The screw fastener member has a second enlarged portion within the tube. The space between the first and second enlarged portions is less than the thickness of the tube to hold the screw fastener member frictionally in the tubular member and to prevent rotation of the screw fastener member relative to the tubular member. A second tubular member has a portion positioned adjacent to the aperture in the first tubular member and the screw fastener member. A second screw fastener member is rotatably mounted in the second tubular member and is held therein. The second screw fastener member is threadedly mounted in the first mentioned screw fastener member connecting the second tubular member to the first tubular member.

4 Claims, 6 Drawing Figures

CONNECTOR CONSTRUCTION

BACKGROUND OF THE INVENTION

In the construction of many items, wherein tubular members are interconnected, especially in furniture construction, it is desirable to provide a connector construction which holds the parts together securely and provides a pleasing appearance. Typical connectors are shown in U.S. Pat. No. 3,850,534, issued Nov. 26, 1974 to Robert W. O'Halloran, entitled "Chair Connector"; U.S. Pat. No. 4,261,667, to Evander M. Ervin, Ervin E. Dargan and Richard Ferguson, issued Apr. 14, 1981, entitled, "Cove Joints, Furniture Therefrom, And Furniture Manufacturing Method"; and U.S. Pat. No. 4,262,230, to Robert D. Vandermiden, issued Apr. 28, 1981, entitled, "Joint For Outdoor Furniture". All of the connector constructions disclosed in the aforementioned patents are not particularly well adapted for use with furniture which is manufactured from extruded plastic tubing. In the utilization of extruded plastic tubing, it is desirable not only to provide a connector construction which may be easily concealed, but one in which the construction may be assembled when certain of the parts are made of a long continuous piece of tubing. It is therefore desirable to provide a connector construction wherein there is a minimum of exposed parts or openings and which exposed parts or openings may be selectively placed in positions which are not readily noticeable.

SUMMARY OF THE INVENTION

The present invention relates to an improved construction for coupling one tubular member to another tubular member which tubular member constitutes a part of an article of furniture. A first tubular member has an aperture contained therein. A first screw fastener member is mounted in the aperture of the tubular member. Said first screw fastener member has an enlarged portion exteriorly of the tubular member preventing the screw fastener member from passing through the aperture into the interior of the tubular member. The screw fastener member has a second enlarged portion in the interior of the tubular member. The first and second enlarged portions of the screw fastener member frictionally engage the portion of the tubular member surrounding the aperture to prevent rotation of the screw fastener member relative to the tubular member. A second tubular member has a portion positioned adjacent to the aperture in the first tubular member. A second screw fastener member is rotatably mounted in the second tubular member and is held in the second tubular member. The second screw fastener member threadedly engages the first mentioned screw fastener member connecting the second tubular member to the first tubular member.

DESCRIPTION OF THE PREFERRED EMBODIMENT

Figure 1:
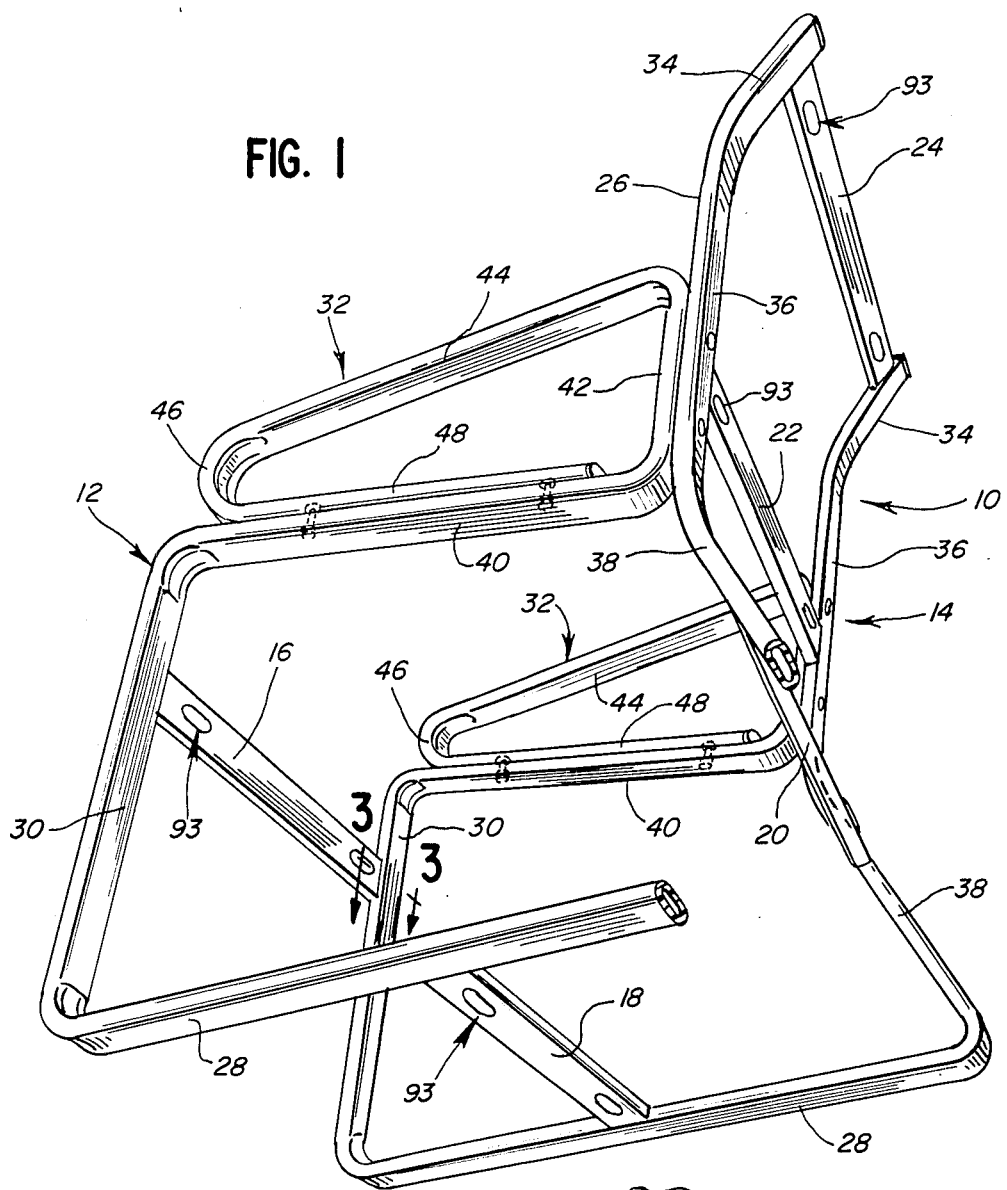
FIG. 1 is a fragmentary perspective view of a chair frame made of a plurality tubular members, wherein the instant connector construction for connecting one tubular member to another tubular member is utilized.

Referring now to the drawings and especially to FIG. 1, a chair frame generally indicated by numeral 10 is shown therein. Frame 10 utilizes a plurality of connector constructions for connecting tubular members which connector constructions embody the herein disclosed invention.

The chair frame is made up of a plurality of extruded flexible weather-resistant polyvinyl chloride tubular members. Chair frame 10 generally includes a pair of mirror image sides 12 and 14 which are connected to each other by tubular cross members 16, 18, 20, 22, and 24.

The sides 12 and 14 having substantially identical parts will have like and mirror image parts identified by the same name and same number. Each side includes a rear upright 26 which has its lower end formed integral with a horizontal floor rail 28. A front upright 30 is formed integral with the other end of each horizontal rail 28. An arm portion 32 is formed integral with the upper end of each upright 30.

Each back upright includes an upper back portion 34 with a main back portion 36 formed integral with the lower end of the upper back portion. A back leg portion 38 is formed integral with the lower end of the main back portion. The lower end of back leg portion 38 is formed integral with horizontal rail 28.

Each arm portion 32 includes a seat bar 40 which has one end formed integral with the upper end of front upright 30. A back bar 42 has its lower end formed integral with the upper end of front upright 30. Back bar 42 is substantially parallel to main back portion 36. An arm rest 44 has one end formed integral with the upper end of back bar 48. A curved connector 46 has one end formed integral with arm rest 44. A lock bar 48 has one end formed integral with other end of connector 46. The lock bar is parallel to seat bar 40.

Figure 2:
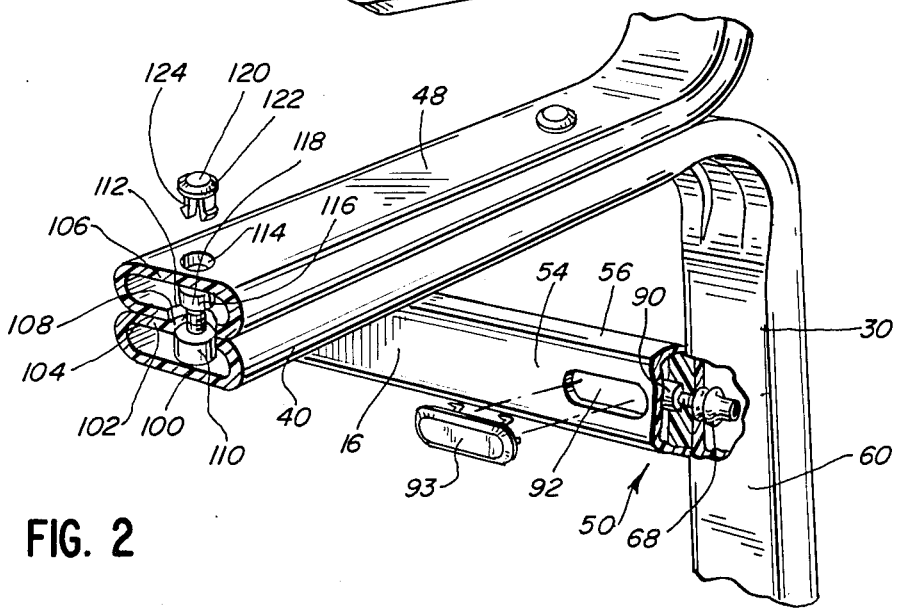
FIG. 2 is an enlarged fragmentary perspective view of the chair frame shown in FIG. 1 with portions broken away and others exploded showing two connector constructions each connecting one tubular member to another tubular member and both embodying the instant invention.
Figure 3:
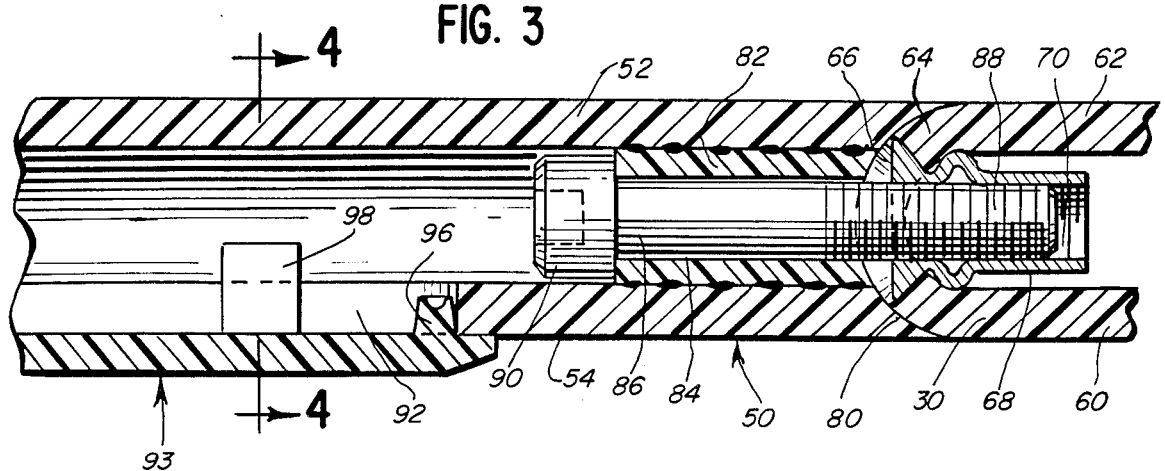
FIG. 3 is an enlarged cross sectional view taken on line 3—3 of FIG. 1 showing one tubular member connected to another tubular member.
Figure 4:
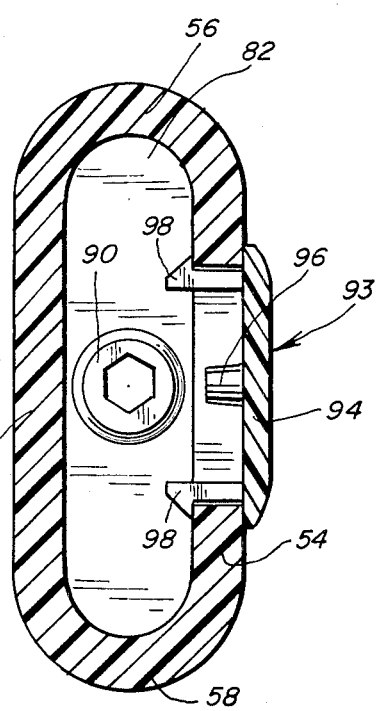
FIG. 4 is a cross sectional view taken on line 4—4 of FIG. 3.

Referring now to FIG. 3, a construction for connecting tubular member 16 to tubular member 30 is shown therein. The subject construction is generally indicated by numeral 50. As may be seen in FIGS. 2, 3, and 4, each of the tubular members includes a pair of parallel faces 52 and 54. The parallel faces are connected at their edges by semicircular connectors 56 and 58. Tubular cross members 16, 18, 20, 22, and 24 have the same cross section described above. The main portions of sides 12 and 14 also have the same cross section; however, the cross section changes in the sides at positions where the respective tubular members are bent.

Looking now to FIG. 3, upright 30 has a pair of parallel faces 60 and 62 which are joined by semicircular connector 64. The semicircular connector contains a circular aperture 66 in its center which aperture has its axis parallel to faces 60 and 62. The axis of aperture 66 is equidistantly spaced from the interior surfaces of faces 60 and 62.

Figure 5:
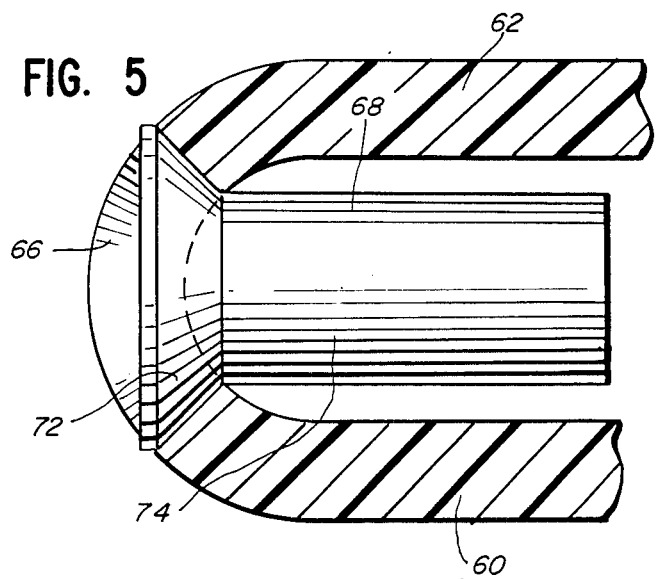
FIG. 5 is an enlarged cross sectional view showing a screw fastener member positioned in an aperture in a tubular member.
Figure 6:
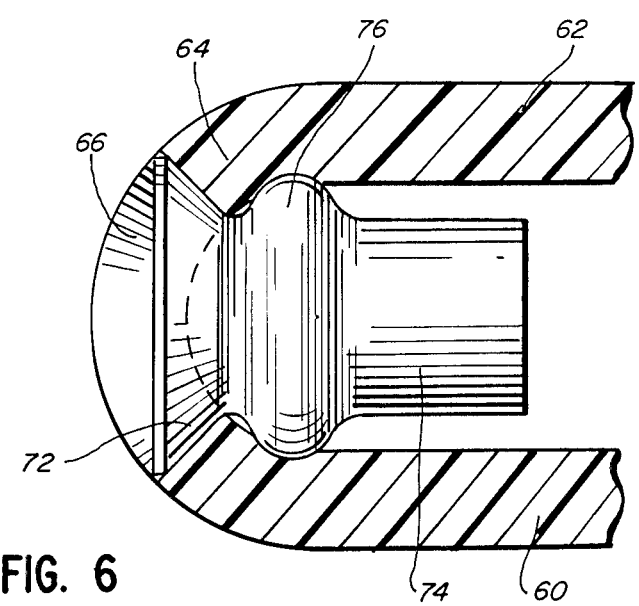
FIG. 6 shows the screw fastener member of FIG. 5 deformed to have an enlarged portion in the interior of the tubular member to lock the screw fastener member in the tubular member.

Looking now to FIG. 5, a screw fastener member 68 having an internal thread 70 is positioned in aperture 66. Screw fastener member 68 includes a head 72 which is an enlarged portion positioned generally exteriorly of the interior of the tubular member. The fastener member includes a cylindrical sleeve 74. By inserting a threaded member into the internally threaded portion 70 and pulling the member toward head 72. Sleeve 74 is expanded to form an enlarged portion 76, as shown in FIG. 6. The enlarged portion is embedded into the plastic of the tubular member so that head 72 and enlarged portion 76 frictionally engage the tubular member at the material surrounding aperture 66 to prevent the screw fastener member from rotating in the aperture.

As may be seen in FIG. 3, cross member 16 has an end 80 conforming to the exterior shape of the semicircular connector 64. Face 52 and face 62 are in the same plane as are faces 54 and 60 to give a smooth interconnection between the cross member and the upright.

A retainer block 82 is adhesively secured in the interior of cross member 16 adjacent to end 80. The exposed surface of block 82 also conforms to the exterior surface of semicircular connector 64. The block includes a fastener aperture 84 which has its axis aligned with the axis of aperture 66.

A screw fastener member 86 is mounted in aperture 84 of the block. Screw fastener member 86 includes an externally threaded portion 88 which threadedly engages the interiorly threaded portion 70. Screw fastener member 86 also includes a conventional head 90, which engages block 82. An elongated drive aperture 92 is formed in face 54 adjacent to the end of the retainer block to allow the screw fastener member 86 to be inserted therein and to allow a tool to be inserted into the interior of cross member 16 for the purpose of tightening or loosening screw fastener member 86.

A molded plastic cap 93 is removably mounted in drive aperture 92. The cap includes a substantially flat cover plate 94 with stops 96 formed integral with the cover plate at opposite ends of the cover plate for positioning the cover plate relative to the aperture. A pair of hooks 98 is formed integral with the cover plate and engages the interior of the tubular cross member for holding the cover plate in position.

The same construction for connecting the other end of cross members 16 to side 12 is utilized therein. Each of the other cross members 18, 20, 22, and 24 has its respective ends connected to sides 12 and 14 by the same construction.

Looking now to FIG. 2, a construction used to secure the lock bar to the seat bar is shown therein. Seat bar 40 has a pair of parallel faces 100 and 102. The lock bar has an identical pair of parallel faces 104 and 106. Face 102 includes an aperture 108 which has a screw fastener member 110 mounted therein. Screw fastener member 110 is identical in construction to screw fastener member 68 and is secured in position in the same manner. A fastener aperture 112 is formed in face 104 and is aligned with aperture 108. A drive aperture 114 is formed in face 106. Drive aperture 114 is aligned with fastener aperture 112 and with screw fastener member 110. A screw fastener member 116 is threadedly mounted in screw fastener member 110. Screw fastener member 116 includes a head 118 which engages the interior surface face 104. Drive aperture 114 allows screw fastener member 116 to be inserted into position and allows for ingress and egress of a tool for driving screw fastener member 116. A molded plastic cap 120 is removably mounted in drive aperture 114. The cap includes a cover 122 with a plurality of legs 124 formed integral therewith for holding the cover in position.

A pair of identical connectors described above secures the lock bar to the seat bar and another pair of identical connectors secures the back bar to the respective back upright.

From the foregoing description, it may be seen how the instant construction for connecting tubular members may be easily utilized, simply by drilling holes in appropriate locations and inserting a screw fastener member which is locked into the tubular member. For an end connection, a retainer is added and an elongated drive aperture is made in the tubular member. For a flat connection, it is only necessary to drill two holes through the other tubular member. The cap may be readily and conveniently inserted into the aperture to provide a substantially flush construction which gives a pleasing appearance and does not protude excessively. Thus, garments or other materials do not catch on the chair frame. Furthermore, it may be appreciated that the construction of the connection may be selected for a position which is least obstrusive both from a visual and a functional standpoint.

Although a specific embodiment of the herein disclosed invention has been shown in the accompanying drawings and described in detail above, it is readily apparent that those skilled in the art may make various modifications and changes without departing from the spirt and scope of the present invention. It is to be expressly understood that the instant invention is limited only by the appended claims.

What is claimed is:

1. A construction for connecting one tubular member to another tubular member comprising, in combination, a first tubular member having an aperture contained therein, a screw fastener member mounted in the aperture of the first tubular member, said screw fastener member having an enlarged portion on the exterior portion of the tubular member preventing the enlarged portion of the screw fastener member from passing through the aperture into the interior of the tubular member, said screw fastener member having a second enlarged portion within the tubular member preventing the second enlarged portion of the screw fastener member from passing through the aperture out of the tubular member, a portion of the tubular member surrounding the aperture exterior held between the first and second enlarged portions of the screw fastener member to prevent rotation of the screw fastener member relative to the first tubular member, a second tubular member having a portion positioned adjacent to the aperture in the first tubular member, and a second screw fastener member rotatably mounted in the second tubular member, said second screw fastener member threadedly engaging the first mentioned screw fastener member connecting the second tubular member to the first tubular member, the first tubular member has a cross section having a pair of parallel opposed faces joined by a semicircular face connector on each of the parallel edges, a fastener retainer positioned in one end of the second tubular member, said end of the second tubular member and the adjacent end of the retainer conforming to the exterior shape of the first tubular member at the portion where the second tubular member abuts the first tubular member, said second screw fastener member rotatably mounted in the fastener retainer.

2. A construction for connecting one tubular member to another tubular member comprising, in combination, a first tubular member having an aperture contained therein, a screw fastener member mounted in the aperture of the first tubular member, said screw fastener member having an enlarged portion on the exterior portion of the tubular member preventing the enlarged portion of the screw fastener member from passing through the aperture into the interior of the tubular member, said screw fastener member having a second enlarged portion within the tubular member preventing the second enlarged portion of the screw fastener member from passing through the aperture out of the tubular member, a portion of the tubular member surrounding the aperture exterior held between the first and second enlarged portions of the screw fastener member to prevent rotation of the screw fastener member relative to the first tubular member, a second tubular member having a portion positioned adjacent to the aperture in the first tubular member, and a second screw fastener member rotatably mounted in the second tubular member, said second screw fastener member threadedly engaging the first mentioned screw fastener member connecting the second tubular member to the first tubular member, the first tubular member has a cross section having a pair of parallel flat sides and a semicircular connector connecting the edges of the flat sides, a fastener retainer mounted in one end of the second tubular member, the end of the second tubular member having the retainer member abutting the first tubular member and conforming to the exterior of the first tubular member, said second fastener member rotatably mounted in the fastener retainer, and said second tubular member having a drive slot adjacent to the fastener retainer for insertion of a tool to rotate the second fastener member in either direction for loosening or tightening the connection of the second fastener member to the first tubular member.

3. A connector construction for connecting one tubular member to another tubular member in furniture construction comprising, in combination, a first extruded plastic tubular member having a cross section with a pair of opposed parallel faces and a semicircular connector connecting each pair of edges to complete the cross section, said first tubular member having an aperture contained in one of the flat faces, a screw fastener member mounted in the aperture of the first tubular member, said screw fastener member having a first enlarged portion exteriorly of the tubular member preventing the screw fastener member from passing through the aperture into the interior of the tubular member, said screw fastener member having a second enlarged portion within the tubular member, a portion of the tubular member surrounding the aperture being frictionally held between the first and second enlarged portions of the screw fastener member to prevent rotation of the screw fastener member relative to the tubular member, a second tubular member having a cross section identical to the first tubular member, said second tubular member having a flat face adjacent to a flat face of the first tubular member, said second tubular member having a fastner aperture in registry with the aperture in the first tubular member, a second screw fastener member rotatably mounted in the fastener aperture and threadedly engaging the first mentioned screw fastener member, said second screw fastener member having an enlarged portion to retain the enlarged portion within the interior of the second tubular member, said second tubular member having a drive aperture aligned with the fastener aperture for insertion of the second screw fastener member into the interior of the second tubular member, and a cap mounted on the drive aperture for selectively closing the drive aperture.

4. A connector construction for connecting an end of a tubular member to a side of another tubular member in an article of furniture, comprising, in combination, a first tubular member having a cross section defined by a pair of parallel flat faces with the adjacent edges of the flat faces being connected by semicircular connectors, said first tubular member having a circular aperture contained in one of the semicircular connectors, said circular aperture having its axis substantially parallel to the flat faces, a screw fastener member mounted in the aperture, said screw fastener member having an enlarged portion exteriorly of the first tubular member preventing the screw fastener member from passing through the aperture into the interior of the tubular member, said screw fastener member having a second enlarged portion within the tubular member, a portion of the tubular member surrounding the aperture frictionally held between the first and second enlarged portions of the screw fastener member to prevent rotation of the screw fastener member relative to the tubular member, a second tubular member having a cross section identical to the cross section of the first tubular member, a fastener retainer block mounted in one end of the second tubular member, the end of the second tubular member having the retainer block abutting the semicircular connector portion of the first tubular member and conforming to the exterior of the semicircular connector portion, a second screw fastener member rotatably mounted in the retainer block, said second screw fastener member threadedly engaging the first mentioned screw fastener member connecting the second tubular member to the first tubular member, said second tubular member having a drive aperture in a flat face for insertion of the second screw fastener member and insertion of a tool to rotate the second fastener member, and a cap mounted in the drive aperture for closing the drive aperture.

* * * * *